United States Patent
Dupays et al.

(10) Patent No.: US 11,905,839 B2
(45) Date of Patent: Feb. 20, 2024

(54) ATTACHMENT OF AN ACOUSTIC SHROUD TO A HOUSING SHELL FOR AN AIRCRAFT TURBINE ENGINE

(71) Applicant: SAFRAN AIRCRAFT ENGINES, Paris (FR)

(72) Inventors: Thomas Dupays, Moissy-Cramayel (FR); Clement Bourolleau, Moissy-Cramayel (FR); Coline Poulenc, Moissy-Cramayel (FR); Anwer Siraj, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 102 days.

(21) Appl. No.: 17/753,547

(22) PCT Filed: Sep. 9, 2020

(86) PCT No.: PCT/FR2020/000236
§ 371 (c)(1),
(2) Date: Mar. 7, 2022

(87) PCT Pub. No.: WO2021/048473
PCT Pub. Date: Mar. 18, 2021

(65) Prior Publication Data
US 2022/0333496 A1 Oct. 20, 2022

(30) Foreign Application Priority Data

Sep. 10, 2019 (FR) ........................................ 1909947

(51) Int. Cl.
*F01D 11/12* (2006.01)
(52) U.S. Cl.
CPC ........ *F01D 11/122* (2013.01); *F05D 2240/11* (2013.01); *F05D 2260/96* (2013.01); *F05D 2300/603* (2013.01); *F05D 2300/614* (2013.01)

(58) Field of Classification Search
CPC ........ F01D 11/12; F01D 11/127; F01D 11/22; F01D 21/045; F05D 2230/30;
(Continued)

(56) References Cited

U.S. PATENT DOCUMENTS 8,202,041 B2 * 6/2012 Wojtyczka ............ F04D 29/023
    415/119
8,231,328 B2 * 7/2012 Reed ...................... F01D 21/045
    415/174.4

(Continued)

FOREIGN PATENT DOCUMENTS

FR          3011033 A1      3/2015
FR          3059362 A1      6/2018
WO       2014/068261 A1    5/2014

OTHER PUBLICATIONS

International Search Report and Written Opinion received for PCT Patent Application No. PCT/FR2020/000236, dated Oct. 29, 2020, 15 pages (7 pages of English Translation and 8 pages of Original Document).

*Primary Examiner* — Courtney D Heinle
*Assistant Examiner* — Danielle M. Christensen
(74) *Attorney, Agent, or Firm* — WOMBLE BOND DICKINSON (US) LLP (57) ABSTRACT

The invention relates to a method for manufacturing an aircraft turbine engine housing, the housing (23) comprising: —an annular shell (29) with axis A; —an annular element (24; 253, 254) attached to the inside of the shell (29), the annular element comprising a body (25) made of NIDA-type cellular material and comprising a downstream portion (252) covered with an abradable material (26), and an upstream portion (251) without abradable material, the body (25) extending in a continuous manner from the upstream portion (251) to the downstream portion (252), the method comprising: —manufacturing the annular element in (Continued)

the form of a continuous annular body, —cutting the annular body into segments (253, 254), —attaching the segments to the shell, and —depositing the abradable material (26) onto the inside surface (25a) of the downstream portion (252).

19 Claims, 7 Drawing Sheets

(58) Field of Classification Search
CPC ............ F05D 2230/50; F05D 2230/51; F05D 2230/54; F05D 2230/60; F05D 2240/11; F05D 2300/603; F05D 2300/614; F02C 7/045; F02C 7/24; F16M 1/04; F16M 1/08
See application file for complete search history.

(56) References Cited

U.S. PATENT DOCUMENTS

| | | | |
|---|---|---|---|
| 9,587,506 B2 * | 3/2017 | Konigs | B29C 70/86 |
| 9,840,936 B2 * | 12/2017 | Lussier | B29C 70/226 |

* cited by examiner

ATTACHMENT OF AN ACOUSTIC SHROUD TO A HOUSING SHELL FOR AN AIRCRAFT TURBINE ENGINE

TECHNICAL SCOPE OF THE INVENTION

The present invention relates to the construction of a housing, in particular of a fan, for an aircraft turbine engine, and in particular to the attachment of an acoustic shroud to a housing shell.

BACKGROUND

A turbine engine conventionally comprises, from upstream to downstream, i.e. in the direction of gas flow, a fan, one or more compressors, a combustion chamber, one or more turbines, and a nozzle for ejecting the combustion gases leaving the turbine(s).

Figure 1:
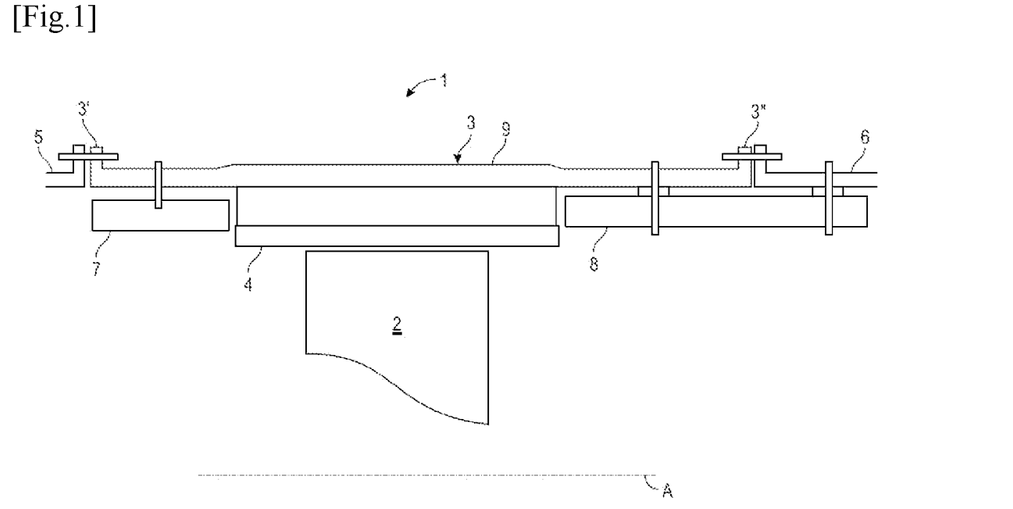
FIG. 1, already described, shows in part a cross-sectional view of a fan of an aircraft turbine engine according to the prior art.

FIG. 1 shows a partial schematic of a fan 1 of an aircraft turbine engine.

The fan 1 comprises an impeller 2 which is surrounded by a fan housing 3, also known as a retention housing, because of its function of retaining the blades in the event of their breakage or in the event of debris entering the fan.

The fan housing 3 typically comprises an annular shell 9 of axis of revolution A which extends around the fan blades 2 of the turbine engine. This shell comprises an annular fixing flange 3', 3" at each of its axial ends. These flanges 3', 3" are used to secure the housing 3 to annular walls of the turbine engine nacelle.

The fan housing 3 is connected upstream to an air inlet sleeve 5 and downstream to an intermediate housing shroud 6.

The housing also has an upstream acoustic shroud 7 (also known as the One Piece Barrel OPB) and downstream acoustic panels 8. The fan housing 3 further comprises an annular layer 4 of abradable material, positioned on an inner annular surface of the shell, between the OPB 7 and the downstream panels 8.

In addition to the retention function, the fan housing 3 is also designed to:
  provide mechanical continuity (of forces and moments) between the air inlet sleeve 5 and the intermediate housing shroud 6;
  allow the attachment of the vein panels (OPB 7, acoustic panel 8 and abradable material layer 4),
  allow the attachment of equipment and supports;
  meet fire and leakage regulations;
  allow for continuity of electrical current for lightning resistance, etc.

For example, the OPB 7 is made of a composite material, while the shell 9 can be made of a composite or metallic material.

Figure 2A:
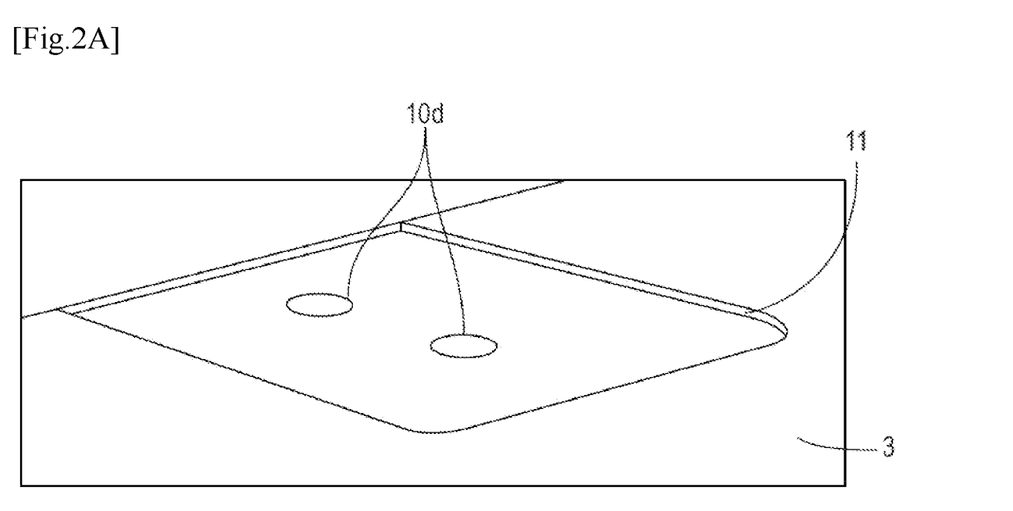
FIG. 2A already described shows a perspective view of a counterbore provided on an internal surface of a composite housing according to the prior art.
Figure 2B:
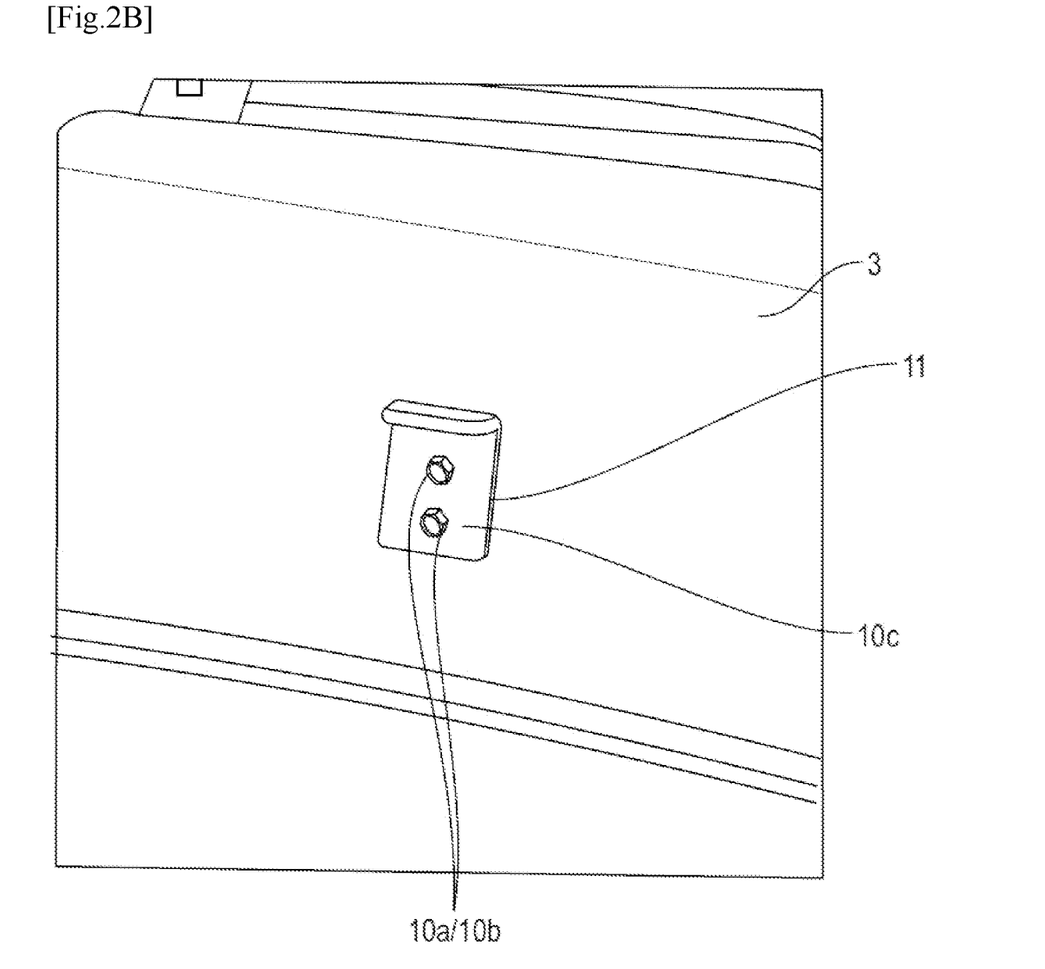
FIG. 2B already described shows an L-shaped fastener mounted in the counterbore illustrated in FIG. 2A according to the prior art.
Figure 2C:
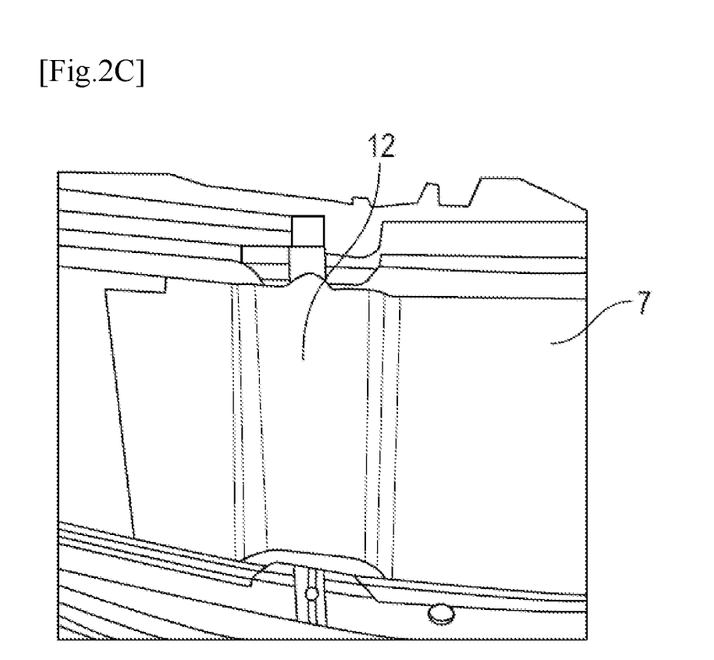
FIG. 2C already described shows a groove provided on an outer surface of an upstream acoustic shroud according to the prior art.
Figure 2D:
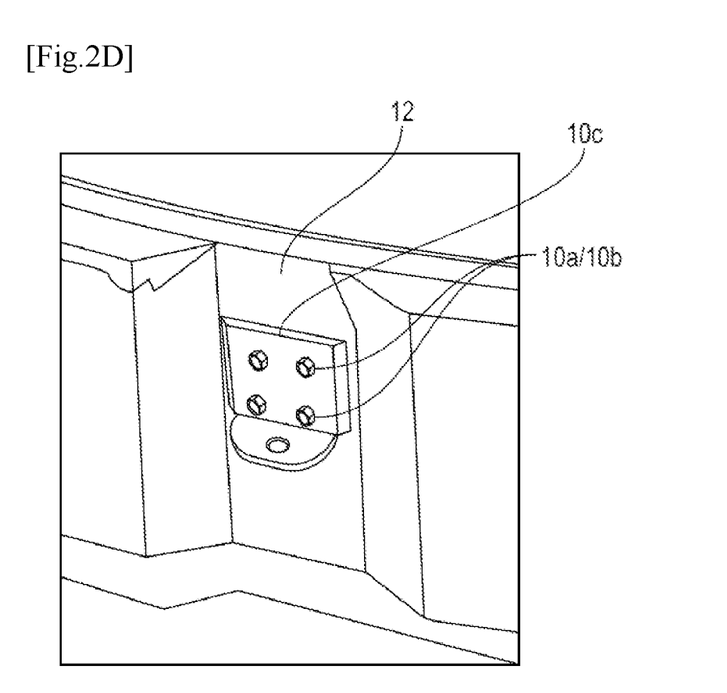
FIG. 2D shows an L-shaped fastener mounted in the groove of FIG. 2C and to be hooked to the L-shaped fastener of FIG. 2B according to the prior art.
Figure 2E:
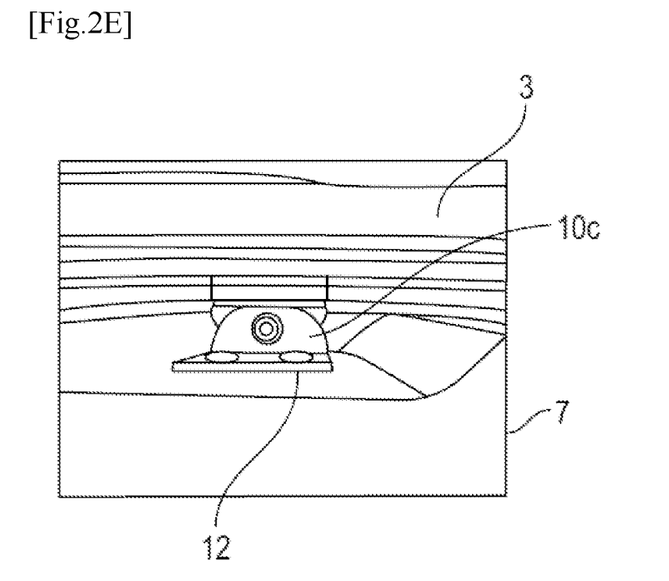
FIG. 2E already described shows a system for attaching L-shaped parts such as those in FIGS. 2B and 2D, these being fixed to each other.
Figure 2F:
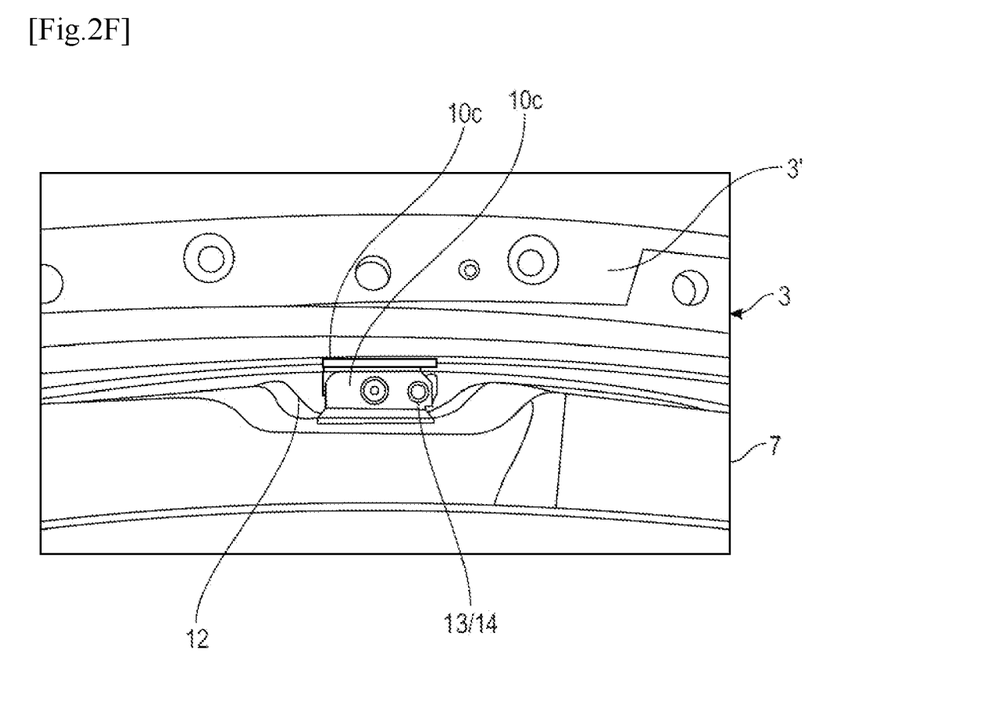
FIG. 2F, already described, shows a so-called positioning variant of the fastening system of FIG. 2E.
Figure 2G:
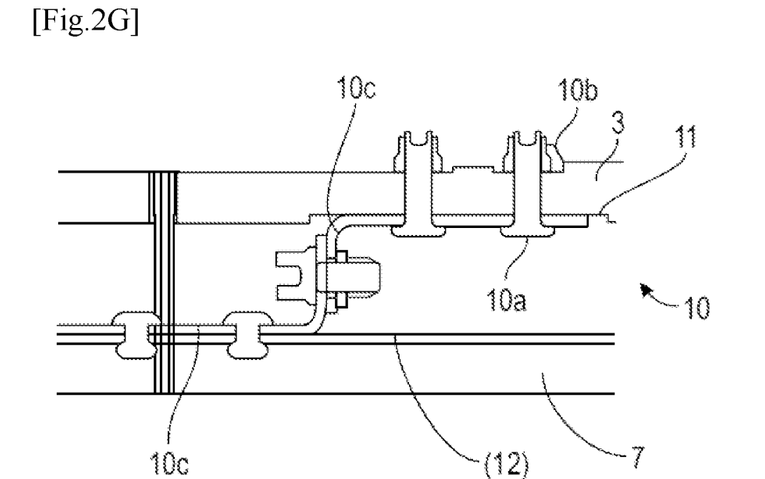
FIG. 2G, already described, shows the fixing system of FIG. 2E in elevation and longitudinal section.
Figure 2H:
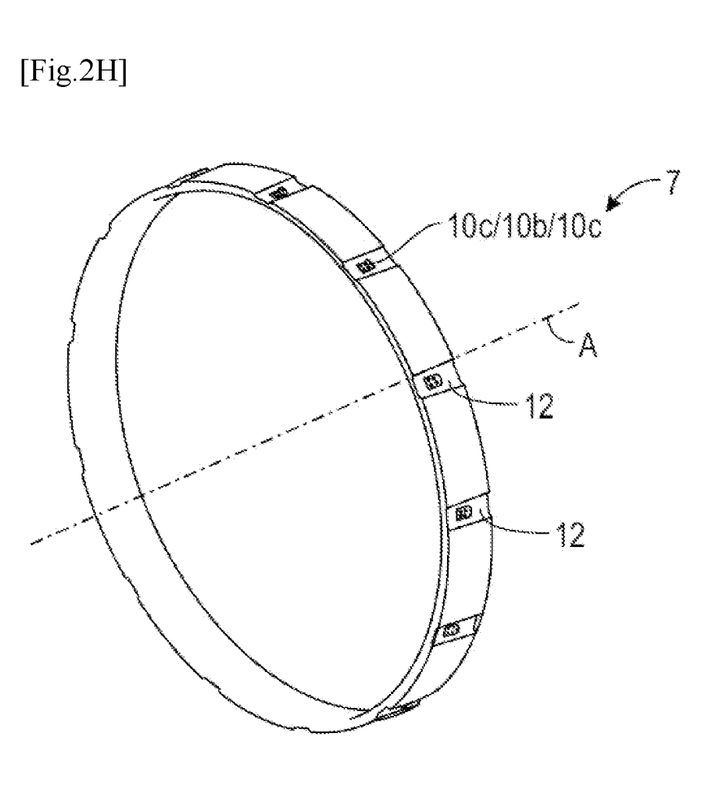
FIG. 2H already described shows an upstream acoustic shroud with grooves and elements of the fixing system of FIG. 2E.

FIGS. 2a to 2h illustrate, for example, a known fixing system 10 of the OPB 7 to the shell 9 by bolted connection (screws 10a, nuts 10b, L-shaped connecting pieces 10c connected to each other in an S-shaped assembly, bores 10d intended to house the screws 10a). This fastening system 10 requires specific structural geometries and machining on each of the components to be assembled, such as counterbores 11 provided on the internal surfaces of the shell 9 (FIGS. 2A and 2B) and longitudinal grooves 12 in the OPB 7 to provide space for the connecting parts 10c (FIGS. 2C and 2D). The assembled fastening system 10 is illustrated in a first standard version in FIG. 2E and in a so-called positioning variant with, for example, a pin 13/hole 14 on the respective connecting parts 10c in FIG. 2F. A schematic view of the connection system in FIG. 2E is further illustrated in elevation and longitudinal section in FIG. 2G. An example of such an existing OPB 7 on which grooves 12 are provided and elements 10a, 10b and 10c of the fastening system 10 are mounted is further illustrated in FIG. 2H.

The particular geometries and machining alter the mechanical properties of the shell 9 and the acoustic properties of the OPB 7. In addition, the fixing system 10 can be a source of stress concentrations as it is "highly" hyperstatic (the six degrees of freedom—translations and rotations—are removed several times), which makes it fragile.

In order to overcome this problem, it is necessary to simplify the geometries and the connection between the OPB 7 and the shell 9.

The document FR 3059362 A1 describes a housing for a turbine engine comprising an annular sound insulation structure within which an abradable element is fixed.

The document FR 3011033 A1 describes a method of producing a housing for a turbine engine by individually manufacturing segments each provided with a support and an abradable element.

The invention therefore proposes, in particular, a method for manufacturing a housing for an aircraft turbine engine, as well as an improved aircraft turbine engine housing. In particular, the housing should be simple in design and installation, economical and easy to manufacture.

SUMMARY OF THE INVENTION

The invention thus relates to a method for manufacturing an aircraft turbine engine housing, the housing comprising:
  an annular shell extending around an axis A;
  an annular element, attached to an inside surface of the shell, the annular element comprising a body which is made of a NIDA-type cellular material and which comprises a downstream portion having a first inside surface covered with a layer of abradable material, and an upstream portion having a second inside surface without abradable material, the body extending continuously from the upstream portion to the downstream portion.

According to the invention, the manufacturing method comprises:
  a step of manufacturing the annular element as a continuous annular body,
  a step of cutting the continuous annular body into body segments
  a step of attaching the body segments to the inside surface of the shell, and
  a step of depositing a layer of abradable material on the inside surface of the downstream portion of the body.

As a result, the housing combines in a single annular element a sound attenuation function and an abradability function, which allows for example to limit production costs thanks to a single part, where the prior art provides two parts (upstream acoustic shroud and abradable support layer or cartridge).

In addition, the method for manufacturing the annular element as a continuous annular body before cutting into ring segments offers the following advantages:
  the cost for manufacturing a single part is limited compared to that of producing several ring segments individually,
  the adhesion of ring segments is simpler than that of an complete ring.

The method according to the invention may comprise one or more of the following features, considered independently of each other or in combination with each other:
- the step for installing the ring segments on the inside surface of the shell comprises a step of filling gaps between the ring segments with an abradable filling material;
- the filling material is a resin comprising a filler in the form of hollow beads, preferably a resin comprising a filler in the form of hollow glass beads, more preferably an epoxy resin filled with hollow glass microspheres;
- the abradable filling gaps material is the same abradable material as the material making up the abradable material layer;
- at the downstream portion, the abradable material layer is integral with the filling material.

The invention further relates to a housing for an aircraft turbine engine manufactured according to the above method.

The housing according to the invention may comprise one or more of the following features, considered independently of each other or in combination with each other:
- the annular element is attached by adhesion to the inside surface of the shell,
- the abradable material layer is disposed in a recess in the downstream portion of the body,
- the abradable layer has an inside surface which extends in the axial extension of the second inside surface,
- a film or fabric, e.g. a laminate, based on fibres covers the first and second inside surfaces of the body made of cellular material, the film itself being covered by the abradable material layer at the first inside surface,
- the downstream portion of the body has a greater axial dimension than the upstream portion,
- the abradable layer has a radial thickness measured with respect to said axis A which is between 2 and 20% of the radial thickness of said body,
- the shell is made of a composite material comprising woven fibres embedded in a resin,
- the number of segments of the body is between two and ten.

The attachment by adhesion of the annular element to the shell is particularly simple, provides stiffness to the housing, allows to dispense with mechanical connections by metal parts and therefore allows a reduction in the mass of the housing, and allows the upstream portion of the annular element to be thickened so as to improve its acoustic attenuation properties.

The invention further relates to an aircraft turbine engine, comprising an aircraft turbine engine housing according to the preceding claim.

The following features may also be implemented in the invention:
- an outside surface of the body of insulating material, radially opposite the inside surfaces, is free of film or fabric based on fibres;
- the abradable material layer is intended to be disposed opposite ends of the vanes of a stator of the aircraft turbine engine.

BRIEF DESCRIPTION OF THE FIGURES

Further features and advantages of the invention will become apparent from the following detailed description, for the understanding of which reference is made to the attached drawings in which:

FIG. 2D The previously described

DETAILED DESCRIPTION OF THE INVENTION

In the following description, the invention is applied to a fan housing 23, for example similar to the fan housing 3 shown in FIG. 1. However, the invention is not limited to this type of housing and can be applied to other housings of a turbine engine.

Figure 4:
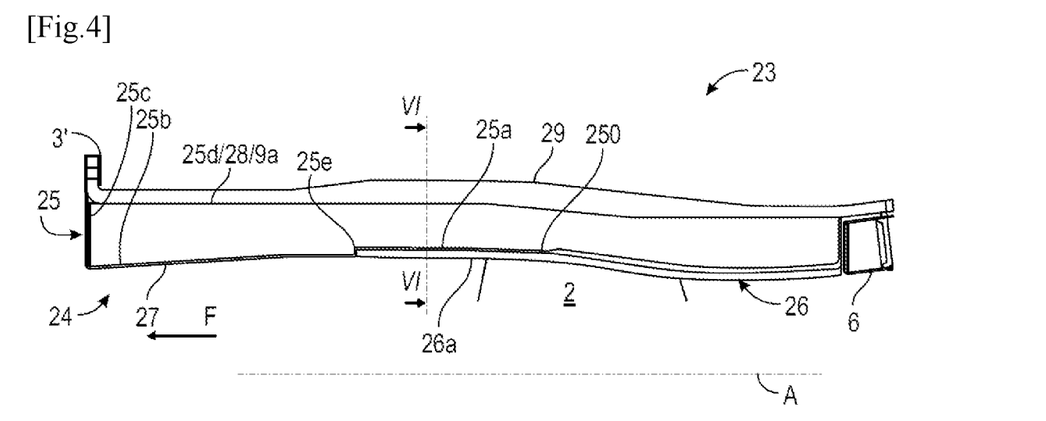
FIG. 4 is a cross-sectional view showing part of a fan of an aircraft turbine engine, the fan comprising the shroud as shown in FIG. 3.
Figure 5:
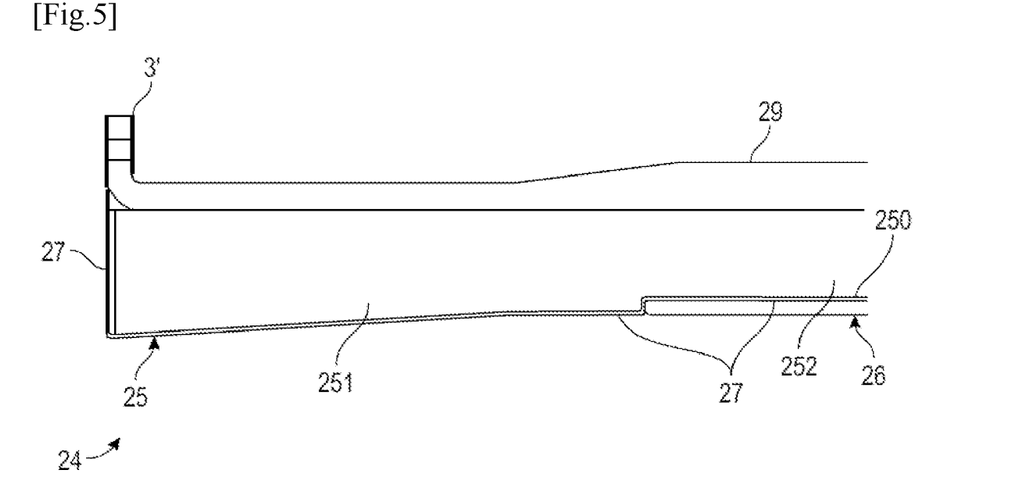
FIG. 5 is an enlargement of a front part of FIG. 4.

The housing 23 to which the invention applies has a generally annular shape about an axis A (see for example FIG. 4). An arrow F denotes a fore-and-aft orientation of the illustrated elements with respect to their orientation once installed in the turbine engine.

The housing 23 comprises:
- an annular shell 29 extending around the axis A and made of a composite material comprising woven fibres embedded in a resin, and
- a shroud 24 provided and configured to be disposed inside the shell 29 in a so-called installed state, and to cover an inner annular surface 29a of a front section of the shell 29 (FIG. 4).

The shroud 24 comprises a main body 25 of sound insulating material, forming a sound insulation module, or sound attenuation module, and a layer of abradable material 26.

The main body 25 has an upstream portion 251 and a downstream portion 252. The upstream 251 and downstream portion 252 extend continuously with each other. The downstream portion 252 has a first inside surface 25a and the upstream portion 251 has a second inside surface 25b.

The body 25 has, continuously in this order, the first inside surface 25a, a shoulder 25e, the second inside surface 25b, an upstream annular edge 25c, an outside surface 25d.

Figure 3:
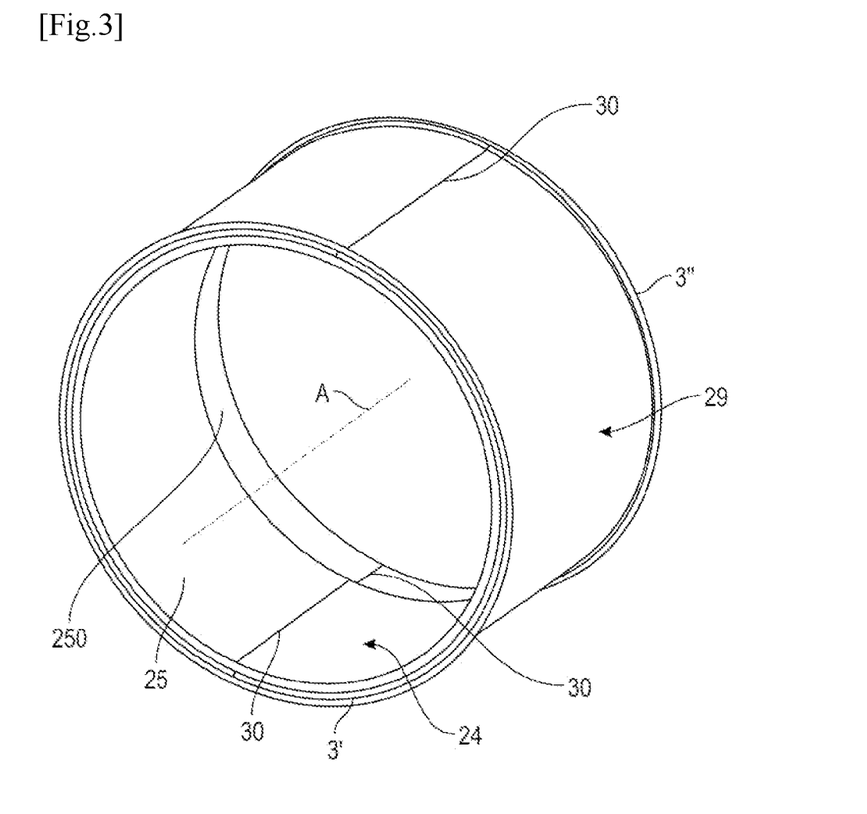
FIG. 3 shows a perspective view of a shroud according to the invention, here without a layer of abradable material.

The first and second inside surfaces 25a and 25b are annular and extend longitudinally about the axis A. The second inside surface 25b is provided forward, or upstream, of the first inside surface 25a according to the intended forward-rearward orientation F of the shroud 24 when installed in the turbine engine 1. The transition from the first inside surface 25a to the second inside surface 25b is provided by the inward shoulder 25e, i.e. this transition corresponds locally to a reduction in the diameter of the inner cross-section of the body 25. The first inside surface 25a thus forms, together with the shoulder 25e, an outward recess 250 relative to the second inside surface 25b (FIGS. 3 and 4).

The abradable material layer 26 is formed on the main body 25. More specifically, the abradable material layer 26 is provided in the recess 250, so as to cover the first inside surface 25a of the main body 25. Preferably, the abradable material layer 26 is shaped such that an inside surface 26a thereof is flush with the second inside surface 25b, i.e. the inside surface 26a of the abradable layer 26 extends in axial extension of the second inside surface 25b.

Preferably, the main body 25 comprises a cellular material, the pockets (not shown) preferably being arranged in a honeycomb structure. Such a material is also known as NIDA.

The main body 25 further comprises at least one film 27, or fabric for example laminated, based on fibres, preferably based on carbon fibres. Preferably, the body 25 comprises several films 27 superimposed by draping. For the sake of readability, only one film 27 will be mentioned below.

The film 27 based on fibres covers the first and second inside surfaces 25a and 25b of the body 25. The film 27 is itself covered by the abradable material layer 26 at the first inside surface 25a, i.e. in the recess 250. Preferably, the film 27 is folded upstream and also covers the upstream annular edge 25c of the body 25.

Preferably, the outside surface 25d of the body 25, which is radially opposite the inside surfaces 25a, 25b, is free of the film 27 based on fibres. This latter feature can contribute greatly to limiting the mass of the shroud 24 and limits the draping time of the body 25.

The shroud 24 is glued into the shell 29, i.e. on an inside surface 29a of the shell 29. A thickness of adhesive 28 is thus arranged between the shroud 24 and the shell 29 (FIG. 4). The thickness of adhesive 28 is, for example, non-limitingly applied as a film to the outside surface 25d of body segments 253, 254 or ring segments composing the shroud 24 (see further details of the segments 253, 254 below). The shroud 24 is then placed in the shell 29 and the assembly is heated, for example in an autoclave, to cause the body segments 253, 254 to bond to the surface 29a. Preferably, the pressure is applied to the shroud 24 to ensure that it is pressed tightly against the surface 29a during heating.

Preferably, the shroud 24 is manufactured as a continuous annular body, i.e. the shroud 24 is a piece extending 360 degrees when manufactured. The shroud 24 is preferably then cut into ring segments which can then be installed on the inside surface 29a of the shell 29.

The number of ring segments may be, for example, between two and ten. For example, the shroud shown in FIGS. 3 and 6 has, but not limited to, two ring segments 253 and 254. Such a method of manufacturing a shroud in the form of a continuous annular body before cutting into ring segments offers the following advantages:

- the cost of manufacturing a single part is limited compared to that of producing several ring segments individually,
- the adhesion of ring segments is simpler than the adhesion of a full ring.

Figure 6:
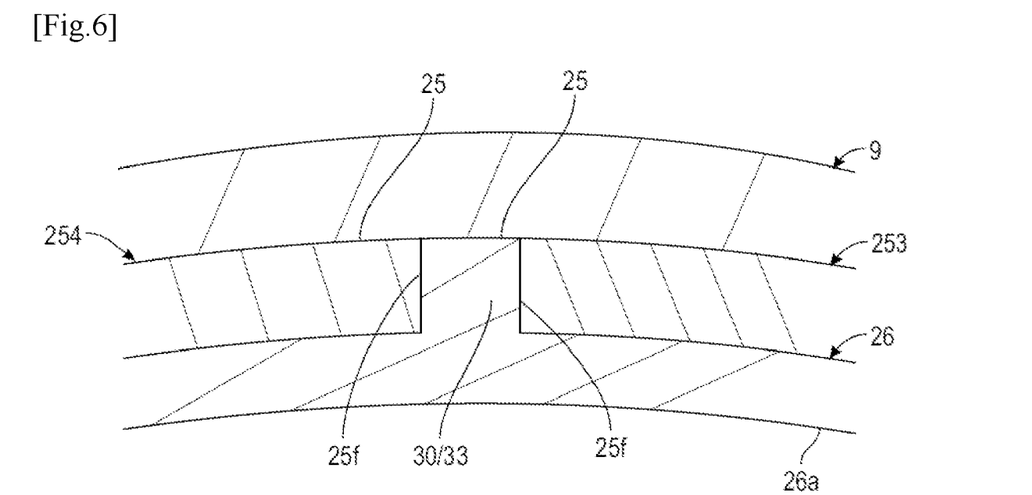
FIG. 6 is a schematic cross-sectional view according to the markings VI in FIG. 4.

Once the ring segments 253, 254 have been bonded to the surface 29a, gaps 30 may appear between the segments 253, 254, specifically between ends 25f of each segment 253 and 254 (FIGS. 3 and 6). These gaps 30 are both the result of the cutting of the segments 253, 254 and a desired clearance for easy installation of the segments 253, 254 in the shell 29.

The gaps 30 are preferably filled with a filling or covering material 33 (FIG. 6). The filling material 33 is preferably an abradable material, such as the abradable material comprising the layer 26, including at the acoustic insulation or attenuation module in front of the layer 26.

The abradable material of the layer 26 and/or the filling material 33 is/are a resin comprising a filler in the form of hollow balls (e.g. glass). The abradable material may be an epoxy resin filled with hollow glass microspheres (e.g. that marketed under the reference DM R76-059, Scotch-Weld EC-3524 B/A Black).

It is noted that in FIG. 6, and more generally at the downstream portion 252, the layer of abradable material 26 is integral with the filling material 33.

The invention provides advantages at several levels. From a technical point of view, in particular from a mechanical point of view:

- the housing shell does not undergo machining, for example of the type of the counterbores of the prior art. The integrity of the composite material of the shell is therefore not altered and the continuity of the fibres therein is preserved, which avoids the concentration of stresses in the shell;
- the interface between the OPB and the layer of abradable material of the prior art, which causes aerodynamic disturbances, is eliminated;
- the connection by adhesion of the shroud to the shell increases the overall stiffness of the housing and improves the general vibratory behaviour thereof and the turbine engine;
- the aforementioned connection by adhesion is of the surface type, unlike the point connections of the prior art, which limits the mechanical stresses during operation;
- the elimination of the metal bonds, the carbon fold of the outer face of the acoustic insulation module, the downstream edge of the OPB and the upstream edge of the support layer of the abradable material are accompanied by a gain in mass.

From an acoustic point of view:

- the elimination of the metal connections allows to dispense with the related grooves in the body of the acoustic attenuation module, thus allowing the acoustic insulation material comprising the honeycomb structure to have a constant height in an azimuthal manner, i.e. over the entire circumference of the acoustic insulation module in a plane perpendicular to the longitudinal axis of the shroud and the turbine engine; all the pockets of the honeycomb structure are thus of the same height in an azimuthal manner, which eliminates the azimuthal disturbance of the prior art and enables the acoustic insulation module to offer a better acoustic insulation efficiency;
- the acoustically treated surface is increased.

From an industrial point of view:

the fusion of the acoustic insulation module with the abradable layer module, distinct in the prior art, generally reduces the industrial costs (one part to be produced, transported, etc. instead of two);

the elimination of machining on the inside surface of the shell reduces the manufacturing cycle time;

the elimination of mechanical connection parts reduces the number of components to be purchased, stored and managed (brackets, screws, rivets, washers, nuts, seal at the interface between the sound insulation module and the abradable material support layer);

the manufacture of the sound insulation module and more generally of the combined shroud is simplified (uniformity of the honeycomb material which does not require specific machining, elimination of the folds on the outer face of the sound insulation module, simplified fold draping) and the number of three-dimensional checks is significantly reduced;

there is no longer any need for specific tooling for the assembly and disassembly of the connections, unlike the screwed connections of the prior art (e.g. torque spanners, spanner extensions).

In addition, the disappearance of the bracket connections is accompanied by the disappearance of the problems and constraints inherent to them: cracks and residual tensile stresses (resulting from bending), the need for numerous visual checks, adjustment of assembly clearances (static constraints), risk of imbalances and related vibration problems.

The invention claimed is:

1. A method for manufacturing an aircraft turbine engine housing, the housing comprising:

an annular shell extending about an axis A;

an annular element, attached to an inside surface of the shell, the annular element comprising a body which is made of a honeycomb-type cellular material and which comprises a downstream portion having a first inside surface covered with a layer of abradable material, and an upstream portion having a second inside surface without abradable material, the body extending continuously from the upstream portion to the downstream portion, the manufacturing method comprising:

a step of manufacturing the annular element as a continuous annular body, a step of cutting the continuous annular body into body segments, a step of attaching the body segments to the inside surface of the shell, and a step of depositing a layer of abradable material on the inside surface of the downstream portion of the body.

2. The manufacturing method according to claim 1, wherein the abradable material of the abradable material layer is a resin comprising a filler in the form of hollow beads.

3. The manufacturing method according to claim 1, wherein the step of attaching the body segments on the inside surface of the shell comprises a step of filling gaps between the body segments with an abradable filling material.

4. The manufacturing method according to claim 3, wherein the filling material is a resin comprising a filler in the form of hollow beads.

5. The manufacturing method according to claim 3, wherein the abradable filling gaps material is the same abradable material as the material making up the abradable material layer.

6. The manufacturing method according to claim 5, wherein at the downstream portion the abradable material layer is integral with the filling material.

7. The manufacturing method according to claim 3, wherein the filling material is a resin comprising a filler in the form of hollow glass beads.

8. The manufacturing method according to claim 3, wherein the filling material is an epoxy resin filled with hollow glass microspheres.

9. A housing for an aircraft turbine engine manufactured by the method of claim 1.

10. The housing according to claim 9, wherein the annular element is attached by adhesion to the inside surface of the shell.

11. The housing according to claim 9, wherein the abradable material layer is disposed in a recess of the downstream portion of the body.

12. The housing according to claim 9, wherein the abradable layer has an inside surface which extends in the axial extension of the second inside surface.

13. The housing according to claim 9, wherein a film based on fibres covers the first and second inside surfaces of the body made of cellular material, the film itself being covered by the abradable material layer at the first inside surface.

14. The housing according to claim 9, wherein the downstream portion of the body has a greater axial dimension than the upstream portion.

15. The housing according to claim 9, wherein the abradable layer has a radial thickness measured with respect to said axis A which is between 2 and 20% of the radial thickness of said body.

16. The housing according to claim 9, wherein the shell is made of a composite material comprising woven fibres embedded in a resin.

17. The housing according to claim 9, wherein the number of segments of the body is between two and ten.

18. The manufacturing method according to claim 1, wherein the abradable material of the abradable material layer is a resin comprising a filler in the form of hollow glass beads.

19. The manufacturing method according to claim 1, wherein the abradable material of the abradable material layer is an epoxy resin filled with hollow glass microspheres.

* * * * *